J. KEITH.

MACHINES FOR MAKING AND SETTING BLIND STAPLES.

No. 7,094. Reissued May 2, 1876.

WITNESSES:

Jas. F. Duhamel,

Thomas Byrne,

INVENTOR:

Jeremiah Keith

PER

H. S. Abbot

ATTORNEY.

UNITED STATES PATENT OFFICE.

JEREMIAH KEITH, OF PROVIDENCE, RHODE ISLAND, ASSIGNOR TO HENRY G. THOMPSON, OF MILFORD, CONNECTICUT.

IMPROVEMENT IN MACHINES FOR MAKING AND SETTING BLIND-STAPLES.

Specification forming part of Letters Patent No. 112,719, dated March 14, 1871; reissue No. 7,094, dated May 2, 1876; application filed February 24, 1876.

*To all whom it may concern:*

Be it known that I, JEREMIAH KEITH, formerly of Charlton, in the county of Worcester and State of Massachusetts, but now of Providence, in the county of Providence and State of Rhode Island, have invented an Improvement in Machine for Making and Setting Blind-Staples, of which the following is a specification:

This invention relates, primarily, to a new construction or organization of machines for forming blind-staples, and driving them into blind-slats and the blind-slat rods; but it is obvious that the same mechanical devices are capable of driving the formed staples into other articles of many and various materials, the invention itself consisting in the various details of arrangement and method of operation of the mechanism hereinafter described.

Figure 1:
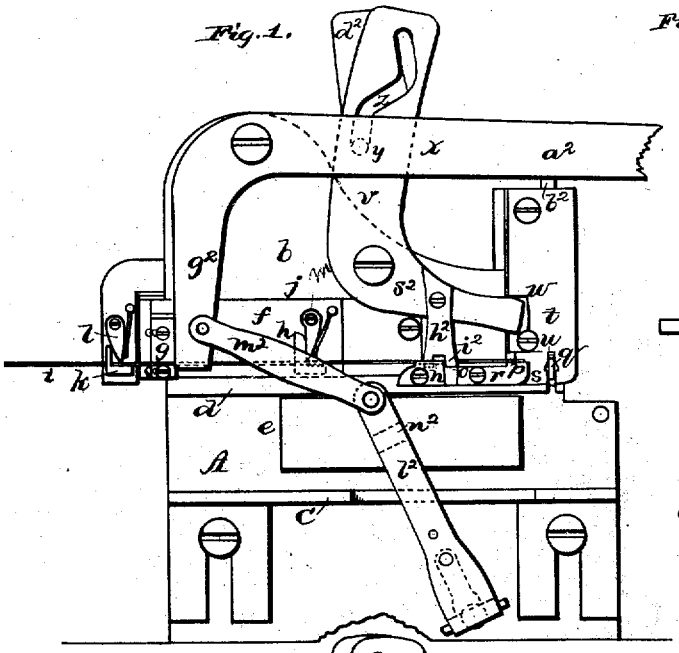
Figure 2:
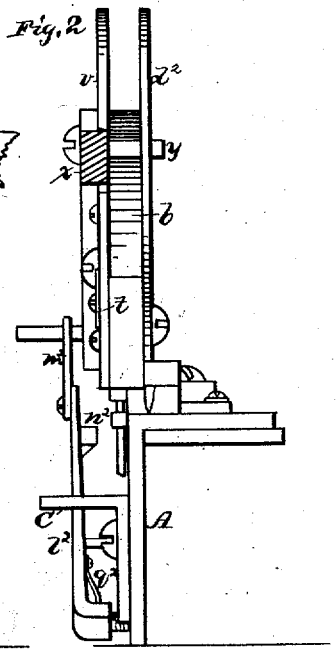
Figure 3:
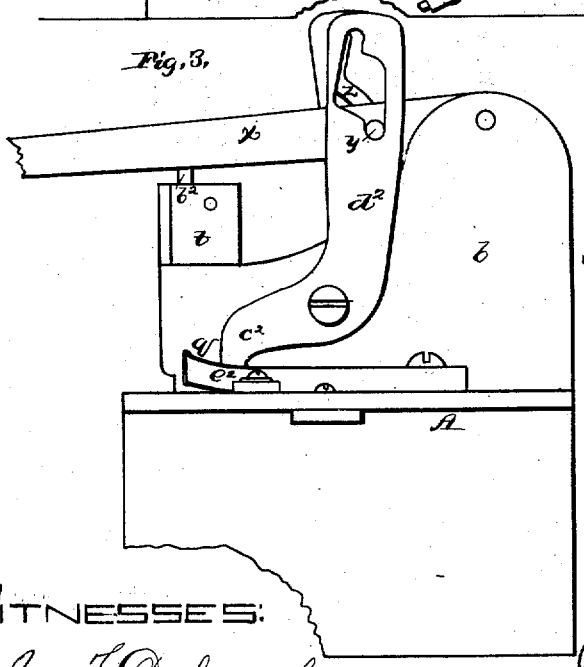

In the accompanying drawing, forming part of this specification, Figure 1 is a front elevation of the machine; Fig. 2, an end elevation, and Fig. 3 a rear elevation. The other figures illustrate details to be hereinafter described.

A is the bed of the machine, which, in connection with an upright wall, *b*, supports the mechanism. C is a vertically-adjustable table, upon which the slat-rod or other material to be "stapled" is placed, the lower edge resting on this table, and the upper edge extending under a shoulder, *d*, the back of the slat being supported against a vertical face, *e*. The top of the shoulder *d* and another shoulder, *j*, form ways, in which travels a reciprocating slide, *f*, on the front and near the opposite ends of which are two frames, *g h*, in each of which is a hole for the passage of the staple-forming wire *i*, said wire entering the machine through a stationary eye-piece, *k*, and passing under a spring-stop, *l*, which permits the wire to be drawn forward, but prevents it slipping back.

The wire passes under a spring-feeder, *m*, on the slide *f*, and as the slide moves forward this feeder is pressed down upon the wire, and draws it forward with it, the projected end of the wire extending through a guide-eye, *n*, over a ledge or bed, *o*, through a guide-eye, *p*, and over a beak or anvil, *q*, the said guide-eyes being formed in a plate, *r*, fastened upon the front of the upright frame *b*.

The end of the plate *r*, near the eye *p*, is provided with an angular cutting-edge. Above the said cutting-edge is a reciprocating bender plate or punch, *t*, also provided with a cutting-edge, *s*, the said cutting-edge acting, in conjunction with the cutting-edge of the plate *r*, as a shears to cut the wire at any desired angle, depending upon the angle given to the said cutting-edges. If preferred, a cutting-edge may be omitted from the bender plate or punch *t*, and be confined to the plate *r* alone. Before or just as the edge of the bending punch or fork *t* reaches the wire, the fork of the punch strikes the wire over the top of the beak *q*. The edge *s* of the punch *t* has a slot or fork, *u*, of a width exceeding the thickness of the beak *q*, and as the punch moves down it bends one end of the wire *i* over the beak *q*, and down against its sides, the wire being compressed into longitudinal internal grooves within the longitudinal central opening, in which the driving-rod $b^2$ is operated, and thereby forms the wire into a staple, the end of the wire projecting beyond the beak being of the length to form one of the staple-legs, and the length of wire from the beak to the mouth of the eye *p* forming the other leg.

When the staple is thus formed its two points are just above the edge of the slat or other article to be stapled, and the bottom of the bending punch or fork *t* descends against the slat and holds it. The reciprocating movement of the punch is effected by a lever, *v*, one arm of which extends into a slot, *w*, in the bending fork or punch, and this lever is actuated by another lever, *x*, by means of a pin, *y*, which extends into a winding slot, *z*, in the lever *v*.

After the lever-arm $a^2$ has effected the movement of the bender plate or punch *t* down upon the slot, the arm still further descends, but without imparting movement to the bender-plate *t*, and strikes the head of a driving-rod or hammer, $b^2$. The bottom of the driving-rod rests upon the formed staple and over the beak; but just before the lever-arm $a^2$ drives down the staple, the inclined end $c^2$ of a lever, $d^2$, is forced in between an arm, $e^2$, from the end of which projects the beak *q*, and the upright *b*, and presses said beak back from under the staple, out of the path of movement of the driving-rod $b^2$, the upper arm of the lever $d^2$ having a winding slot, $f^2$, into which projects the pin $y$, which pin, striking one side of the slot as it moves down, thereby causes the lower end of the lever to force back the beak $q$.

When the pin $y$ rises it strikes another side of the winding slot, thereby throwing up the lower end of the lever $a^2$, and freeing the beak-arm $e^2$, which is then pressed forward again by a suitable spring.

The beak $q$ having been thrown back, the driving-rod descends upon the staple and forces it into or through the slat, rod, or other staple-receiving material. When the next staple is formed by the descent of the bender-plate $t$ the driving-rod $b^2$ gives way as the bender descends. The carrier or slide $f$ is moved forward by the lower arm $g^2$ of the lever $x$, the forward movement of this arm causing it to strike the plate $h$ and move the slide, and with it the wire. This movement takes place just after the same movement of the lever $x$ has effected the rise of the cutting and bending punch or fork $t$, and of the driving-rod or hammer $b^2$, and the forward movement of the beak $q$ leaving these parts in position to receive the advancing end of the wire $i$.

When the wire is being cut and formed by the descent of the upper arm of the lever $x$, the arm $g^2$ moves back, striking the plate $g$, and returning the carrier-slide $f$ to its normal position, the stop $m$ yielding, and allowing the plates $g$ $h$ to slip upon the wire, the stop $l$ holding the wire stationary during the back movement of the carrier-plate.

Figure 5:
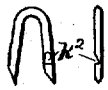

Fixed to the lever-arm $s^2$ is a cutting-stock, $h^2$, having at its lower end two cutters, $i^2$, and just as the said arm is completing its descent these cutters strike the opposite sides of the wire $i$, cutting upon each side of the wire a nick, $k^2$, as seen in Fig. 5, the wire being subsequently cut off between the two nicks, so that a nick is formed upon one end of one staple and upon one end of another by each action of the cutters. The metal displaced in cutting each nick forms a barb, which helps to secure the staple in the slot into which it may be driven.

When the slat-rod is to have the staples applied to it, the table $c$ is raised and fastened in position to enable the slat-rod to be properly supported and presented to the action of the staple-driving mechanism. To feed the rod a rocker-arm, $l^2$, may be connected by a link, $m^2$, to the lever-arm $g^2$, and a projection, $n^2$, upon this arm in its forward movement should strike one of a series of teeth on a strip or rack secured to the rod. When the slats are being stapled the link is disjointed from the lever, and the rocker-arm may then act as a presser to keep the slat up to the face $e$, for which purpose it is provided with a spring, $q^2$, the pressure of which holds the arm against said face.

Figure 4:
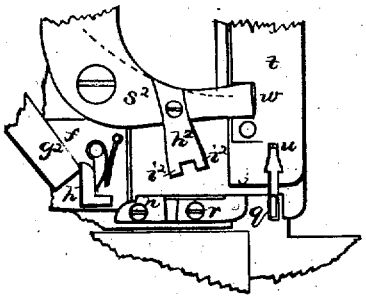

Fig. 4 in the drawing shows the bender-plate $t$ at its highest position, with the mechanism adjacent thereto.

Having thus fully described this improvement in machines for making and setting blind and other staples, as of my invention, I claim—

1. In combination with the supporting-table $d$, the sliding and feeding carrier-plate $f$, the bender plate or fork $t$, provided with a cutting-edge, $s$, and the driving-rod $b^2$, all combined and arranged to operate substantially as hereinbefore set forth.

2. In combination with the mechanism for cutting, forming, and driving the wire staples, the cutters $i^2$, whereby the wire is nicked, substantially in the manner and for the purpose hereinbefore set forth.

3. In combination with the reciprocating bender-plate $t$ and driving-rod $b^2$, the reciprocating beak $q$, whereon the wire is bent before the driver descends, substantially as hereinbefore set forth.

4. The reciprocating punch or bending-fork $t$, operating to sever the wire in its descent upon the former-bed, to bend the wire into a staple over a suitable mandrel or beak, $q$, and to carry the staple so formed forward into position to be driven, substantially as hereinbefore set forth.

5. The reciprocating punch or bending-fork $t$, constructed with a cutting-edge, and with internal longitudinal grooves, whereby a staple-blank is severed, bent around a suitable mandrel, and held and guided for driving, substantially as hereinbefore set forth.

6. The reciprocating punch or bending-fork $t$, constructed with a longitudinal central opening, through or within which opening a hammer or staple-driving rod may operate, in combination with a cutting plate or die, substantially as hereinbefore set forth.

7. The reciprocating punch or bending-fork $t$, constructed with a cutting-edge and a longitudinal central opening, through or within which opening a hammer or staple-driving rod may operate, in combination with a mandrel or beak, $q$, substantially as hereinbefore set forth.

8. The punch or bending-fork $t$, the mandrel or beak $q$, and the staple-driving rod $b^2$, operating in combination for purposes of severing a wire, of forming a staple therefrom, and of driving the same into or through the material without previous perforation, all substantially as hereinbefore set forth.

9. The combination of a bending and cutting punch or fork with a hammer or driving-rod, whereby a staple is forced into or through the staple-receiving material, while the hammer rests on the head of the staple, substantially as hereinbefore set forth.

10. The former or bender plate $t$, so constructed that, as it descends with the staple, its bottom shall come in contact with and hold in position the material receiving the staple while the staple is being driven, substantially as hereinbefore set forth.

11. In combination with the feeding, cutting, bending, and driving mechanism hereinbefore described, the arm $l^2$ and link $m^2$ for effecting the feed movement of a slat-rod, substantially as set forth.

12. In combination with the staple-forming and driving mechanism hereinbefore described, the die plate or cutter $r$, whereby both ends of the staple are pointed at any desired angle, substantially as set forth.

In testimony that I claim the foregoing I have hereunto set my hand this 18th day of February, 1876.

JEREMIAH KEITH.

Witnesses:
D. B. POTTER,
HENRY G. THOMPSON.